(12) United States Patent
Baek et al.

(10) Patent No.: US 8,623,542 B2
(45) Date of Patent: Jan. 7, 2014

(54) PCM OF IMPROVED ASSEMBLING TYPE STRUCTURE AND BATTERY PACK EMPLOYED WITH THE SAME

(75) Inventors: Ju-Hwan Baek, Chungcheongbuk-do (KR); Cheol Woong Lee, Seoul (KR)

(73) Assignee: LG Chem, Ltd., Seoul (KR)

( * ) Notice: Subject to any disclaimer, the term of this patent is extended or adjusted under 35 U.S.C. 154(b) by 599 days.

(21) Appl. No.: 12/747,853

(22) PCT Filed: Nov. 14, 2008

(86) PCT No.: PCT/KR2008/006715
§ 371 (c)(1),
(2), (4) Date: Nov. 5, 2010

(87) PCT Pub. No.: WO2009/078585
PCT Pub. Date: Jun. 25, 2009

(65) Prior Publication Data
US 2011/0039130 A1    Feb. 17, 2011

(30) Foreign Application Priority Data
Dec. 14, 2007  (KR) .................. 10-2007-0131631

(51) Int. Cl.
*H01M 2/22* (2006.01)
*H01M 2/24* (2006.01)
*H01M 2/26* (2006.01)
*H01R 43/16* (2006.01)

(52) U.S. Cl.
USPC ................. 429/161; 429/7; 429/211; 29/874

(58) Field of Classification Search
USPC .................. 429/7, 93, 121–347; 439/884
See application file for complete search history.

(56) References Cited

U.S. PATENT DOCUMENTS
2007/0262745 A1 * 11/2007 Lee et al. .................. 320/112

FOREIGN PATENT DOCUMENTS

| KR | 10-2004-0029757 A | 4/2004 |
| KR | 10-2005-0121116 A | 12/2005 |
| KR | 10-2006-0037850 A | 5/2006 |
| KR | 10-2007-0067781 A | 6/2007 |
| KR | 10-2007-0080868 A | 8/2007 |
| WO | WO 2007/046586 A1 | 4/2007 |

* cited by examiner

*Primary Examiner* — Basia Ridley
*Assistant Examiner* — James Lee
(74) *Attorney, Agent, or Firm* — Birch, Stewart, Kolasch & Birch, LLP (57) ABSTRACT

Disclosed herein is a protection circuit module (PCM) including a protection circuit for controlling overcharge, overdischarge, and overcurrent of a battery, wherein a pair of connection members are attached to the bottom of the PCM, while the connection members are electrically connected to the protection circuit, the connection members being constructed by bending a sheet material into a predetermined shape, to form groove-shaped connection structures into which plate-shaped electrode terminals of a battery cell are inserted and coupled. Each of the connection members includes a lower connection plate, a pair of rear extensions, and front extensions.

14 Claims, 5 Drawing Sheets

PCM OF IMPROVED ASSEMBLING TYPE STRUCTURE AND BATTERY PACK EMPLOYED WITH THE SAME

FIELD OF THE INVENTION

The present invention relates to a protection circuit module (PCM) of an improved assembling type structure and a battery pack including the same, and, more particularly, to a PCM including a protection circuit for controlling overcharge, overdischarge, and overcurrent of a battery, wherein a pair of connection members are attached to the bottom of the PCM, while the connection members are electrically connected to the protection circuit, the connection members being constructed by bending a sheet material into a predetermined shape, to form groove-shaped connection structures into which plate-shaped electrode terminals of a battery cell are inserted and coupled, and each of the connection members includes a lower connection plate, a pair of rear extensions, and front extensions.

BACKGROUND OF THE INVENTION

As mobile devices have been increasingly developed, and the demand of such mobile devices has increased, the demand of secondary batteries has also sharply increased as an energy source for the mobile devices. One of the secondary batteries is a lithium secondary battery having high energy density and discharge voltage, on which much research has been carried out and which is now commercially and widely used.

However, various combustible materials are contained in the lithium secondary battery. As a result, there is a possibility of danger in that the lithium secondary battery can be heated or explode due to overcharge, overcurrent, or any other external physical impacts. In other words, the lithium secondary battery has low safety. Consequently, a protection circuit module (PCM) for effectively controlling the abnormality of the lithium secondary battery, such as overcharge, is mounted in the lithium secondary battery while the PCM is connected to a battery cell of the lithium secondary battery.

The PCM includes a field effect transistor (FET), which serves as a switching element for controlling electric current, a voltage detector, and passive elements such as a resistor and a capacitor. The PCM interrupts overcharge, overdischarge, overcurrent, short circuits, and reverse voltage of the battery to prevent the explosion or the overheating of the battery, the leakage of liquid from the battery, and the degradation of the charge and discharge characteristics of the battery, and to suppress the lowering of the electrical efficiency of the battery and the abnormal behavior of the battery, thereby eliminating dangerous factors from the battery and increasing the service life of the battery.

Generally, the PCM is connected to the battery cell via conductive materials, such as nickel plates, by welding or soldering, which provides a high coupling strength. However, the welding or soldering process, performed with respect to small-sized devices, such as the battery cell, requires a high degree of technical skill with the result that skilled persons are needed. Also, the welding or soldering process requires a large working space. Furthermore, when physical impacts are applied to the battery cell, an electrical short may occur, and therefore, the battery cell may catch fire or explode. In other words, safety-related problems may occur. In addition, it is required for safety elements, including the PCM, to be maintained in electrical connection with the electrode terminals of the battery cell and, at the same time, to be electrically isolated from other parts of the battery cell. Consequently, a plurality of insulative mounting members are required to construct such connection, with the result that the battery assembling process is complicated.

In connection with this matter, there have been proposed technologies for coupling the PCM to the battery cell without using the conventional welding or soldering in order to solve the problems caused by the welding or soldering. For example, Korean Patent Application Publication No. 2007-0067781 discloses a lithium polymer battery including an electrode assembly, a sheathing member having an internal space for receiving the electrode assembly defined therein, side residual parts extending outward from opposite sides of the internal space, a front residual part extending outward from the front of the internal space, the front residual part being folded in the direction in which the internal space is located (hereinafter, referred to as an 'upward direction'), and a circuit board disposed at the front of the sheathing member, the circuit board being electrically connected to electrode tabs extending from two electrodes of the electrode assembly, the electrode tabs being partially exposed out of the sheathing member through the front residual part and bent downward.

Also, Korean Patent Application Publication No. 2004-0029757 discloses a secondary battery including a battery cell having a PCM installation space, a PCM for interrupting overcharge, overdischarge, and overcurrent, a pair of terminals disposed at the rear of the PCM, a pair of connection tabs fixed to the respective terminals, a pair of electrode tabs, made of an aluminum plate and a nickel plate, respectively, connected to the electrode plates of the battery cell, one end of each electrode tab being fixed to the corresponding connection tab, wherein the PCM is installed in the PCM installation space such that the front of the PCM is exposed by bending the electrode tabs once.

However, the above-described technologies have problems in that the electrode tabs bent downward from the front of the battery cell sheathing member and connected to the circuit board and the electrode tab pair installed in the PCM installation space, while being bent once, exhibit a low coupling strength with respect to the circuit board and low connection reliability, with the result that contact resistance increases, and therefore, when physical impacts are applied to the battery cell, an electric short circuit occurs, whereby the battery cell may catch fire or explode, i.e., safety-related problems may occur.

Meanwhile, Korean Patent Application Publication No. 2004-0029757 discloses an assembling type PCM including a protection circuit for controlling overcharge, overdischarge, and overcurrent of the battery, wherein a pair of connection members are attached to the bottom of the PCM while being electrically connected to the protection circuit, and the connection members are configured in a groove-shaped connection structure in which plate-shaped electrode terminals of the battery cell are fixedly inserted into the coupling grooves of the respective connection members.

In the above-described connection member, however, it is not easy for the electrode terminals of the battery cell to be inserted into the coupling grooves of the respective connection members, and, when a reliability test, such as a dropping test, is performed, the contact resistance at the coupling regions between the electrode terminals and the connection members may increase, a short circuit may occur, and the coupling grooves may widen.

Consequently, there is a high necessity for a PCM including new-structured connection members that are easy to manufacture, have a simple connection structure, and simultaneously effectively improve the coupling between the battery cell and the PCM and the electrical connection and mechanical coupling between the electrode terminals of the battery cell and the PCM.

SUMMARY OF THE INVENTION

Therefore, the present invention has been made to solve the above problems, and other technical problems that have yet to be resolved.

As a result of a variety of extensive and intensive studies and experiments to solve the problems as described above, the inventors of the present invention have developed a protection circuit module (PCM) including connection members of a specific structure manufactured by bending a sheet material into a predetermined shape, and have found that it is possible to omit a welding or soldering process, which requires plenty of time and a high degree of technical skill, to easily achieve the connection between the protection circuit module and a battery cell, and to improve the coupling between the battery cell and the PCM and the electrical connection and mechanical coupling between the electrode terminals of the battery cells and the PCM through the provision of the protection circuit module.

Consequently, it is an object of the present invention to provide a protection circuit module (PCM) including connection members of a specific structure that is capable of omitting a welding or soldering process, easily achieving the connection between the PCM and a battery cell, and improving the coupling between the battery cell and the PCM and the electrical connection and mechanical coupling between the electrode terminals of the battery cells and the PCM.

In accordance with one aspect of the present invention, the above and other objects can be accomplished by the provision of a protection circuit module (PCM) including a protection circuit for controlling overcharge, overdischarge, and overcurrent of a battery, wherein a pair of connection members are attached to a bottom of the PCM, while the connection members are electrically connected to the protection circuit, the connection members being constructed by bending a sheet material into a predetermined shape, to form groove-shaped connection structures into which plate-shaped electrode terminals of a battery cell are inserted and coupled, and each of the connection members includes a lower connection plate coupled to a terminal connection part of a board having the protection circuit formed thereon ('a protection circuit board'), a pair of rear extensions extending from opposite-side ends of a rear of the lower connection plate, while the rear extensions have a predetermined width in a longitudinal direction, on the basis of a direction in which the corresponding electrode terminal of the battery cell is inserted, the rear extensions being bent forward while being partially bent downward to press the inserted corresponding electrode terminal of the battery cell, the rear extensions being integrated at ends thereof to form an electrode terminal insertion part, and front extensions extending from opposite ends of a front of the lower connection plate, while the front extensions have a predetermined width in a lateral direction, to elastically press the electrode terminal insertion part formed by the rear extensions in a state in which the corresponding electrode terminal of the battery cell is inserted in the electrode terminal insertion part.

In the protection circuit module according to the present invention, therefore, the electrode terminals of the battery cell are fixedly inserted into the corresponding electrode terminal insertion parts of the respective connection members, and the front extensions elastically press the electrode terminal insertion parts of the rear extensions by a simply pressing operation, thereby more securely and stably achieving the electrical connection and mechanical coupling between the electrode terminals of the battery cell and the protection circuit module.

Also, the rear extensions are partially bent downward. Consequently, the tight contact strength between the connection members and the electrode terminals inserted in the respective connection members increases, and therefore, even when an external force is applied to the protection circuit module, e.g., the protection circuit module drops, it is possible to prevent the protection circuit module from deviating from its original position.

The lower connection plate may be coupled to the terminal connection part of the protection circuit board in various manners. Preferably, the lower connection plate is coupled to the terminal connection part of the protection circuit board by soldering or a surface mount technology (SMT).

For reference, the soldering and the surface mount technology are methods of locating solder at joining parts or joining surfaces of joining base materials and coupling the respective joining base materials. The soldering and the surface mount technology are characterized by stably coupling the respective joining base materials. Consequently, it is possible to stably couple the lower connection plate to the terminal connection part of the protection circuit board in the above-described coupling manner.

Also, the surface mount technology is a method of interposing thin solder paste between parts and a joining base material and passing them through a reflow oven, configured in the form of a conveyor to melt the solder paste such that the parts are joined to the joining base material by the molten solder paste. It is possible to more easily and rapidly achieve the coupling between the joining base material and the parts by the surface mount technology than other soldering methods.

Preferably, the downward bent regions of the rear extensions are closer to the lower connection plate than a rear extension starting part and the electrode terminal insertion part such that the rear extensions effectively press the corresponding electrode terminal of the battery cell to stably fix the corresponding electrode terminal of the battery cell to each of the connection members.

As an exemplary example of the above-described structure, the rear extensions may be further provided at the downward bent regions thereof with downward-protruding depression grooves to elastically press the corresponding inserted electrode terminal of the battery cell.

Consequently, it is possible for each of the connection members having the depression grooves to more elastically press the end of the corresponding electrode terminal inserted into the space defined between the lower connection plate and the downward bent regions, with the result that it is possible to effectively prevent the corresponding electrode terminal from separating from each of the connection members when an external force is applied to each of the connection members. Also, the depression grooves are in contact with the corresponding electrode terminal of the battery cell in a point contact manner, thereby decreasing the contact resistance between each of the connection members and the corresponding electrode terminal of the battery cell.

Meanwhile, as previously described, the front extensions are bent toward the electrode terminal insertion part formed by the rear extensions, while the front extensions extending from opposite ends of the front of the lower connection plate, to elastically press the top of the electrode terminal insertion part. Consequently, after the protection circuit module is coupled to the corresponding electrode terminal of the battery cell, the front extensions of each of the connection members have a predetermined installation height with respect to the top of the battery cell.

When only the front extensions are formed at each of the connection members, as in the above-described structure, the contact interface between each of the connection members and the top of the battery cell may not be parallel to the top of the battery cell.

For this reason, each of the connection members further comprises a protruding support part formed between the rear extensions, such that the protruding support part extends from the lower connection plate and is vertically bent upward in the shape of a '⊓', to secure an installation height of the connection member parallel to the battery cell. Consequently, the PCM and the top of the battery cell are located in parallel to each other by the three protruding regions, i.e., the protruding support part and the two front extensions, and therefore, the protection circuit module is more stably mounted to the battery cell.

Meanwhile, as previously described, the front extensions are bent toward the electrode terminal insertion part formed by the rear extensions to press the top of the electrode terminal insertion part.

In order that the corresponding electrode terminal of the battery cell is easily inserted and fixed in the electrode terminal insertion part, therefore, the corresponding electrode terminal of the battery cell may be inserted into each of the connection members while ends of the front extensions are spaced apart from the corresponding electrode terminal insertion part, and, after the insertion of the corresponding electrode terminal of the battery cell is completed, the front extensions may be deformed to elastically press the top of the electrode terminal insertion part.

In a concrete example, the ends of the front extensions are spaced a predetermined distance from the top of the electrode terminal insertion part, and, after the insertion of the corresponding electrode terminal of the battery cell is completed, sides of the front extensions are pressed toward the electrode terminal insertion part using jigs. As a result, the ends of the deformed front extensions simultaneously press the top of the electrode terminal insertion part, thereby more securely achieving the coupling between each of the connection members and the corresponding electrode terminal of the battery cell.

In an exemplary embodiment, the PCM is constructed in a structure of a printed circuit board (PCB), and the connection members are mounted to the bottom of the PCM such that the bottom of the PCM is coupled to the end of the battery cell where the electrode terminals are formed. Consequently, the connection members are mounted to the PCM, which is configured in the thin printed circuit board structure, and therefore, the PCM and the battery cell are more compactly and stably coupled to each other.

The position of the connection members is not particularly restricted so long as the connection members are mounted to the bottom of the PCM while the connection members are electrically connected to the protection circuit. For example, the connection members may be coupled to opposite ends of the bottom of the PCM such that the electrode terminal insertion parts of the respective connection members are oriented side by side in a lateral direction of the PCM.

Preferably, the connection members are made of a metal material. For example, it is possible to manufacture the lower connection plate, the rear extensions, and the front extensions in an integrated structure by cutting and bending a metal sheet.

In accordance with another aspect of the present invention, there is provided a method of manufacturing a connection member, which is mounted to the protection circuit module with the above-described construction, the method including cutting a metal sheet into a predetermined shape, bending opposite sides of a rear of the metal sheet roundly forward in a longitudinal direction while the opposite sides of the rear of the metal sheet are spaced a predetermined distance from each other, bending opposite sides of the rear of the metal sheet once again in the shape of a downward taper to form downward bent regions, and bending ends of the downward bent regions in the shape of an upward taper, such that an electrode terminal insertion part is formed, to form rear extensions, and deforming opposite sides of a front of the lower connection plate in a lateral direction, such that a top of the electrode terminal insertion part is elastically pressed by the deformed opposite sides of the front of the lower connection plate, to form front extensions.

Consequently, it is possible to easily manufacture the connection member, which securely and stably couples the protection circuit module and a corresponding electrode terminal of a battery cell, by a simple method of cutting a metal sheet into a predetermined shape and bending the cut metal sheet in predetermined sequences.

In accordance with a further aspect of the present invention, there is provided a battery pack including a battery cell to which the protection circuit module with the above-described construction is electrically connected.

Preferably, the battery cell is a pouch-shaped battery cell including an electrode assembly of a cathode/separator/anode structure mounted in a pouch-shaped case formed of a laminate sheet including a resin layer and a metal layer.

In the battery pack, the PCM may be connected to the battery cell in various manners. For example, the upper end sealing part, through which the electrode terminals of the battery cell protrudes outward, may be vertically bent upward such that the upper end sealing part is brought into contact with a cell body of the battery cell, the electrode terminals may be vertically bent downward such that the electrode terminals are inserted into the electrode terminal insertion parts of the protection circuit module, and the front extensions may be deformed by pressing, whereby the PCM is connected to the battery cell.

Meanwhile, the battery cell, to which the PCM is connected, is mounted in a pack case to manufacture a battery pack. Preferably, a region defined between the battery cell and the PCM is filled with an electrically insulative resin by insert injection molding, whereby it is possible to manufacture the battery pack in a more stable structure.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, exemplary embodiments of the present invention will be described in detail with reference to the accompanying drawings. It should be noted, however, that the scope of the present invention is not limited by the illustrated embodiments.

Figure 1:
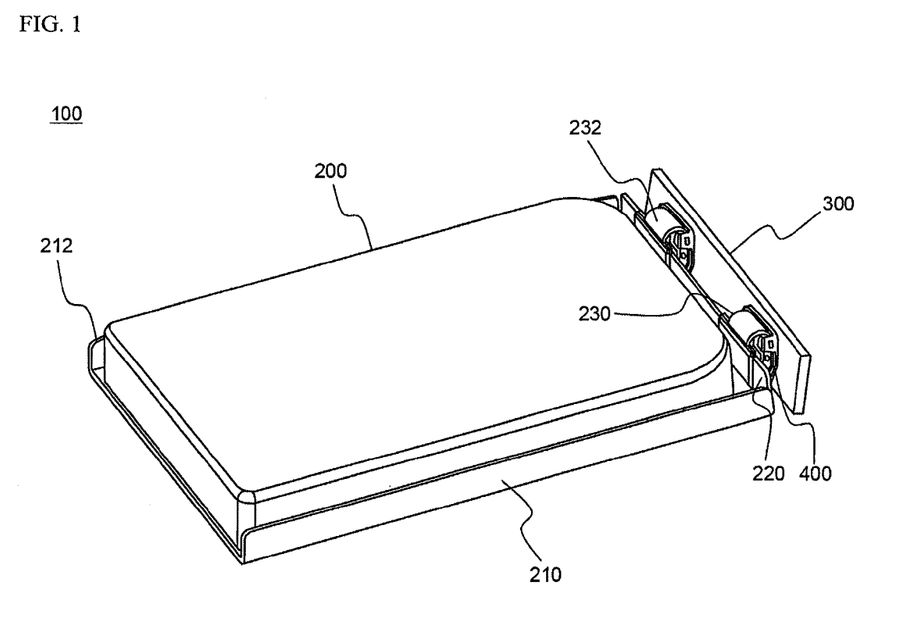
FIG. 1 is a perspective view illustrating a battery pack including a protection circuit module (PCM) of an assembling type structure according to an exemplary embodiment of the present invention.

FIG. 1 is a perspective view illustrating a battery pack including a protection circuit module (PCM) of an assembling type structure according to an exemplary embodiment of the present invention. For easy understanding, the coupling between a battery cell and the PCM is shown while a pack case is omitted from the drawing.

Referring to FIG. 1, the battery pack 100 includes a battery cell 200 having plate-shaped electrode terminals 230 and 232 protruding from one side thereof and a PCM 300 having connection members 400, which are coupled to the respective electrode terminals 230 and 232, attached to the bottom thereof.

The battery cell 200 is manufactured by thermally welding a pouch-shaped battery case, formed of an aluminum laminate sheet, while an electrode assembly is mounted in the battery case. By the thermal welding, sealing parts 210, 212, and 220 are formed at the opposite sides and upper end of the battery case, respectively. The pair of plate-shaped electrode terminals 230 and 232, connected to the electrode assembly, protrudes outward through the upper end sealing part 220.

Figure 3:
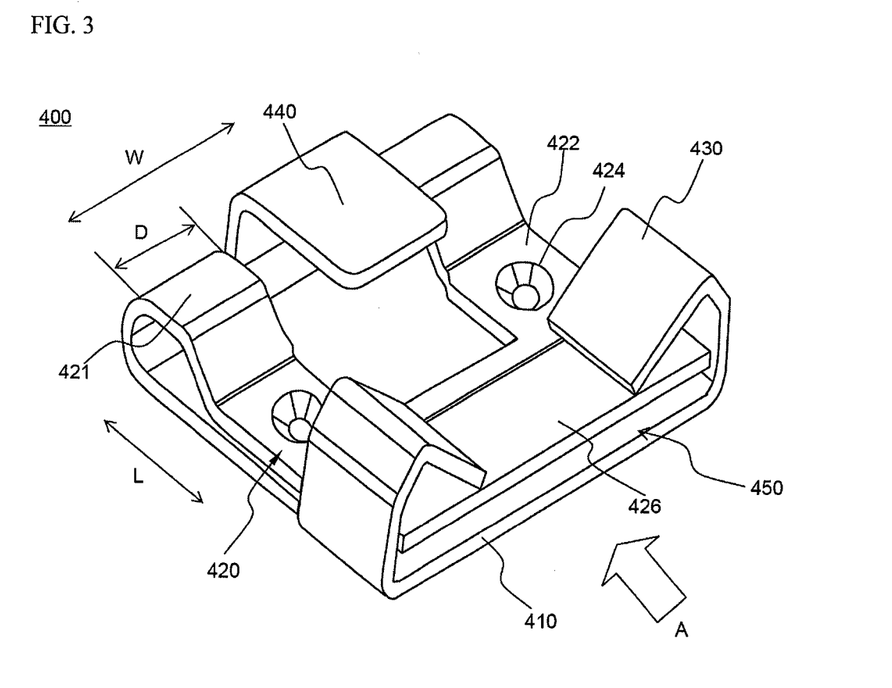
FIG. 3 is an enlarged perspective view illustrating a connection member shown in FIG. 2.
Figure 4:
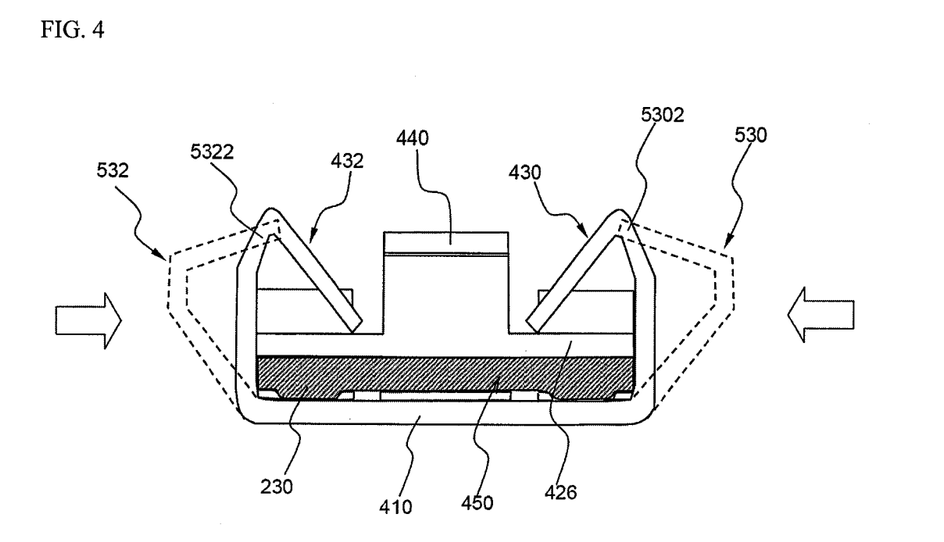
FIG. 4 is a vertical sectional view typically illustrating a structure in which an electrode terminal is inserted into the connection member of FIG. 3.

The sealing parts 210, 212, and 220 are vertically bent upward such that the sealing parts 210, 212, and 220 are brought into tight contact with a cell body of the battery cell. The plate-shaped electrode terminals 230 and 232 are vertically bent downward once again such that the plate-shaped electrode terminals 230 and 232 are coupled to the corresponding connection members 400 of the PCM 300. The details of the PCM 300 and the connection members 400 are shown in FIGS. 2 to 4.

Figure 2:
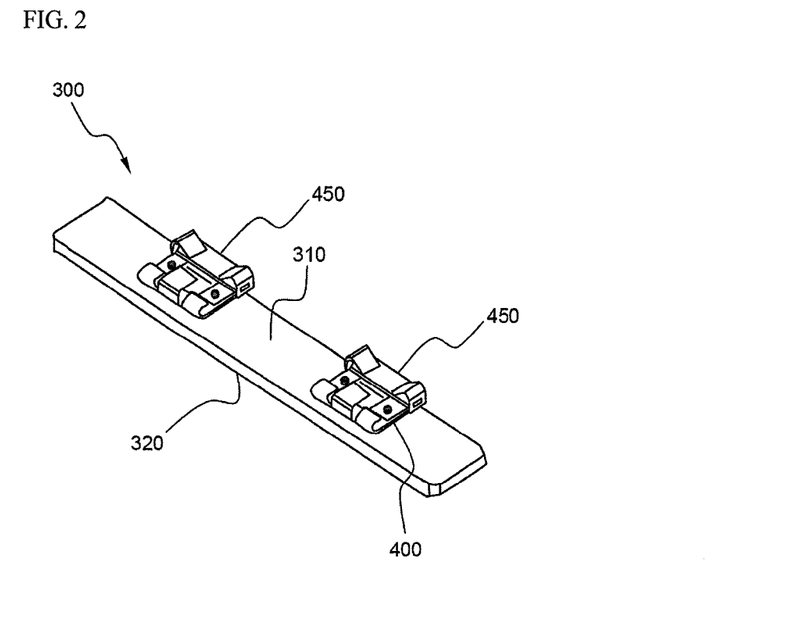
FIG. 2 is a perspective view illustrating an assembling type PCM according to an exemplary embodiment of the present invention.

First, FIG. 2 is a perspective view illustrating an assembling type PCM according to an exemplary embodiment of the present invention.

Referring to FIG. 2, the PCM 300 is constructed in a structure of a printed circuit board (PCB) in which a protection circuit for controlling overcharge, overdischarge, and overcurrent of a battery is printed on an epoxy composite board. The connection members 400, which are electrically connected to the protection circuit, are attached to one major surface of the PCM 300. Each of the connection members 400 is provided with an electrode terminal insertion part 450, into which the corresponding plate-shaped electrode terminal (not shown) is inserted. External input and output terminals (not shown) are formed at the other major surface of the PCM 300. The connection members 400 may be attached to one major surface of the PCM by a surface mount technology (SMT).

The electrode terminal insertion parts 450 of the respective connection members 400 are oriented side by side in one direction of the PCM 300. Consequently, it is possible for the plate-shaped electrode terminals of the battery cell as shown in FIG. 1 to be easily inserted into the corresponding electrode terminal insertion parts 450.

FIG. 3 is an enlarged perspective view typically illustrating one of the connection members shown in FIG. 2, and FIG. 4 is a vertical sectional view typically illustrating a structure in which an electrode terminal is inserted into the connection member of FIG. 3.

Referring first to FIG. 3, the connection member 400 is manufactured by cutting a metal sheet into a predetermined shape and bending the cut metal sheet into a specific shape. That is, the connection member 400 is configured in an integrated structure. Specifically, the metal sheet is cut into a shape of the connection member 400 shown in the drawing. Subsequently, a pair of rear extensions 420 are bent roundly forward from opposite-side ends of the rear of a lower connection plate 410 in the longitudinal direction L, while the rear extensions 420 have a predetermined width D, on the basis of the direction A in which the corresponding electrode terminal of the battery cell is inserted. The rear extensions 420 are bent once again in the shape of a downward taper to form downward bent regions 422. The downward bent regions 422 are bent in the shape of an upward taper, such that the electrode terminal insertion part 450 is formed. The ends of the rear extensions 420 are integrated.

Also, the downward bent regions 422 of the rear extensions 420 are closer to the lower connection plate 410 than a rear extension starting part 421 and the electrode terminal insertion part 450. Consequently, when the corresponding electrode terminal (not shown) of the battery cell is inserted into the electrode terminal insertion part 450, the tight contact strength between the end of the electrode terminal and the downward bent regions 422 is improved. Furthermore, downward-protruding depression grooves 424 are formed in the respective downward bent regions 422, with the result that the inserted electrode terminal (not shown) of the battery cell is more securely pressed by the downward-protruding depression grooves 424.

Meanwhile, a protruding support part 440 is formed between the rear extensions 420. The protruding support part 440 extends from the rear of the lower connection plate 410 and is vertically bent upward in the shape of a '⌐'.

Referring now to FIG. 4 together with FIG. 3, the electrode terminal 230 of the battery cell is inserted into a space defined between the lower connection plate 410 and the rear extensions 420, i.e., the electrode terminal insertion part 450, while ends 5302 and 5322 of front extensions 530 and 532 are spaced apart from the electrode terminal insertion part 450. Subsequently, the front extensions 530 and 532 are pressed by jigs (not shown) in directions indicated by arrows such that the front extensions 530 and 532 are deformed as shown in FIG. 4. As a result, the ends of the deformed front extensions 430 and 432 simultaneously elastically press the top 426 of the electrode terminal insertion part 450 such that the electrode terminal 230 is brought into tight contact with the inside of the electrode terminal insertion part 450.

Figure 5:
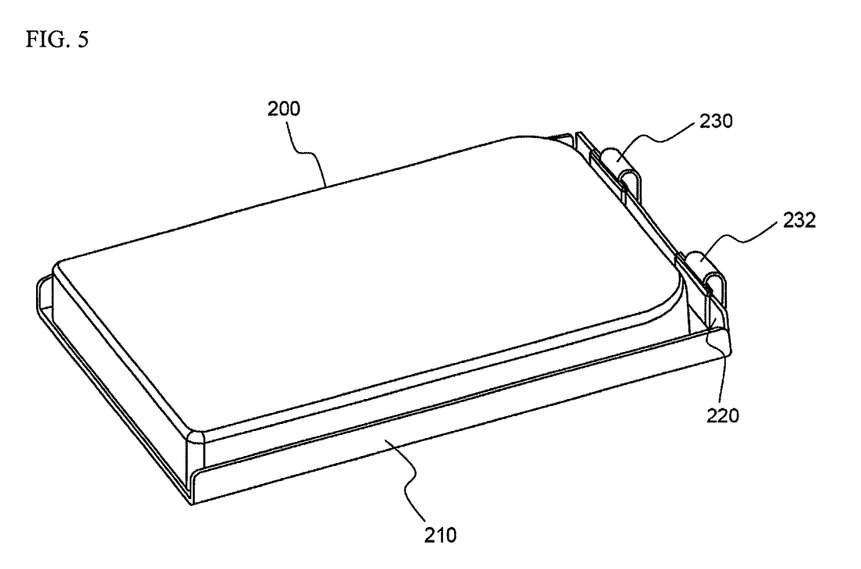
FIGS. 5 to 7 are typical views illustrating a series of assembling processes for coupling the PCM to electrode terminals of a battery cell in the battery pack.
Figure 6:
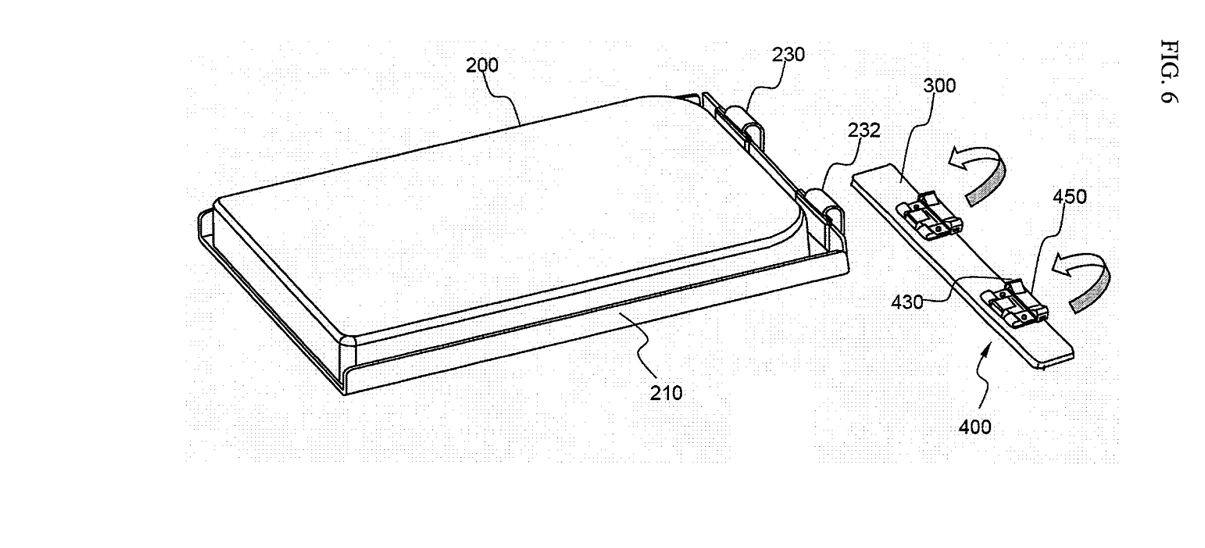
Figure 7:
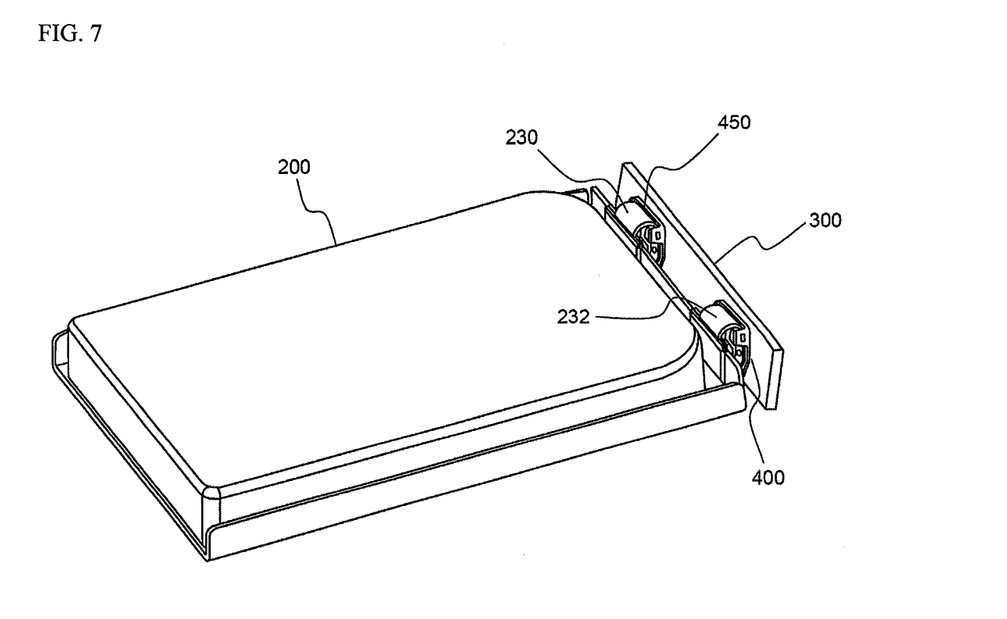

FIGS. 5 to 7 are typical views illustrating a series of assembling processes for coupling the PCM to the electrode terminals of the battery cell in the battery pack.

Referring first to FIG. 5, the side sealing part 210 and the upper end sealing part 220 of the battery cell 200 are vertically bent upward, and then the electrode terminals 230 and 232 are vertically bent downward once again. It is possible to further reduce the size of the battery pack by bending the upper end sealing part 220 and the electrode terminals 230 and 232 as described above. It is preferable for the electrode terminals 230 and 232 to be somewhat gently bent such that the electrode terminals 230 and 232 can be easily inserted into the corresponding electrode terminal insertion parts 450 of the PCM (not shown).

As shown in FIG. 6, the PCM 400 is located such that the electrode terminal insertion parts 450 of the PCM are adjacent to the lower parts of the downward bent electrode terminals 230 and 232 of the battery cell 200. At this time, the front extensions 430 of the PCM 400 are spaced a predetermined distance from the corresponding electrode terminal insertion parts 450.

Subsequently, as shown in FIG. 7, the electrode terminals 230 and 232 are inserted into the corresponding electrode terminal insertion parts 450 of the rear extensions 420, and the front extensions are pressed in the directions indicated by the arrows as shown in FIG. 4. As a result, the connection of the PCM 400 to the battery cell 200 is achieved.

INDUSTRIAL APPLICABILITY

As apparent from the above description, the protection circuit module according to the present invention includes connection members of a specific structure, each including a lower connection plate, rear extensions, and front extensions. Consequently, it is possible to easily manufacture the protection circuit module. Also, it is possible to connect the PCM to the battery cell through a simple assembling process without performing a welding or soldering process, which requires plenty of time and a high degree of technical skill when manufacturing a battery pack. Furthermore, it is possible to simultaneously achieve high mechanical coupling and stable electrical connection at the connection region.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A protection circuit module (PCM) including a protection circuit for controlling overcharge, overdischarge, and overcurrent of a battery, wherein
    a pair of connection members are attached to a bottom of the PCM, while the connection members are electrically connected to the protection circuit, the connection members being constructed by bending a sheet material into a predetermined shape, to form groove-shaped connection structures into which plate-shaped electrode terminals of a battery cell are inserted and coupled, and
    each of the connection members comprises:
    a lower connection plate coupled to a terminal connection part of a board having the protection circuit formed thereon ('a protection circuit board');
    a pair of rear extensions extending from opposite-side ends of a rear of the lower connection plate, while the rear extensions have a predetermined width in a longitudinal direction, on the basis of a direction in which the corresponding electrode terminal of the battery cell is inserted, the rear extensions being bent forward while being partially bent downward to press the inserted corresponding electrode terminal of the battery cell, the rear extensions being integrated at ends thereof to form an electrode terminal insertion part; and
    front extensions extending from opposite ends of a front of the lower connection plate, while the front extensions have a predetermined width in a lateral direction, to elastically press the electrode terminal insertion part formed by the rear extensions in a state in which the corresponding electrode terminal of the battery cell is inserted in the electrode terminal insertion part.

2. The protection circuit module according to claim 1, wherein the lower connection plate is coupled to the terminal connection part of the protection circuit board by soldering or a surface mount technology (SMT).

3. The protection circuit module according to claim 1, wherein the downward bent regions of the rear extensions are closer to the lower connection plate than a rear extension starting part and the electrode terminal insertion part.

4. The protection circuit module according to claim 3, wherein the rear extensions are provided at the downward bent regions thereof with downward-protruding depression grooves to elastically press the corresponding inserted electrode terminal of the battery cell.

5. The protection circuit module according to claim 1, wherein each of the connection members further comprises a protruding support part formed between the rear extensions, such that the protruding support part extends from the lower connection plate and is vertically bent upward in the shape of a '⌐', to secure an installation height of the connection member parallel to the battery cell.

6. The protection circuit module according to claim 1, wherein the corresponding electrode terminal of the battery cell is inserted into the connection member while ends of the front extensions are spaced apart from the corresponding electrode terminal insertion part, and, after the insertion of the corresponding electrode terminal of the battery cell is completed, the front extensions are deformed to elastically press a top of the electrode terminal insertion part.

7. The protection circuit module according to claim 1, wherein the PCM is constructed in a structure of a printed circuit board (PCB), and the connection
    members are mounted to a bottom of the PCM such that the bottom of the PCM is coupled to an end of the battery cell where the electrode terminals are formed.

8. The protection circuit module according to claim 7, wherein the connection members are coupled to opposite ends of the bottom of the PCM such that the electrode terminal insertion parts of the respective connection members are oriented side by side in a lateral direction of the PCM.

9. The protection circuit module according to claim 1, wherein each of the connection members is an integrated structure manufactured by cutting and bending a metal sheet.

10. A method of manufacturing a connection member, which is mounted to the protection circuit module according to claim 1, the method comprising:
    cutting a metal sheet into a predetermined shape;
    bending opposite sides of a rear of the metal sheet roundly forward in a longitudinal direction while the opposite sides of the rear of the metal sheet are spaced a predetermined distance from each other, bending opposite sides of the rear of the metal sheet once again in the shape of a downward taper to form downward bent regions, and bending ends of the downward bent regions in the shape of an upward taper, such that an electrode terminal insertion part is formed, to form rear extensions; and
    deforming opposite sides of a front of the metal sheet in a lateral direction, such that a top of the electrode terminal insertion part is elastically pressed
    by the deformed opposite sides of the front of the metal sheet, to form front extensions.

11. A battery pack including a battery cell to which the protection circuit module according to claim 1 is electrically connected.

12. The battery pack according to claim 11, wherein the battery cell is a pouch-shaped battery cell including an electrode assembly of a cathode/separator/anode structure mounted in a pouch-shaped case formed of a laminate sheet including a resin layer and a metal layer.

13. The battery pack according to claim 11, wherein an upper end sealing part, through which the electrode terminals of the battery cell protrude outward, is vertically bent upward such that the upper end sealing part is brought into contact with a cell body of the battery cell, the electrode terminals are vertically bent downward such that the electrode terminals are inserted into the electrode terminal insertion parts of the protection circuit module, and the front extensions are deformed by pressing, whereby the PCM is connected to the battery cell.

14. The battery pack according to claim 11, wherein a region defined between the battery cell and the protection circuit module is filled with an electrically insulative resin by insert injection molding.

\* \* \* \* \*